United States Patent [19]

Dreyer

[11] 4,017,957
[45] Apr. 19, 1977

[54] HAMMERPIN PULLER

[75] Inventor: Fredrick B. Dreyer, Maplewood, Mo.

[73] Assignee: Gruendler Crusher & Pulverizer Co., St. Louis, Mo.

[22] Filed: June 6, 1975

[21] Appl. No.: 584,606

[52] U.S. Cl. .............................................. 29/252
[51] Int. Cl.² ...................................... B23P 19/04
[58] Field of Search ............ 29/244, 252, 234, 282; 254/29 R

[56] References Cited

UNITED STATES PATENTS 2,915,282  12/1959  Hixson ............................ 254/29 R
3,789,493   2/1974  Province ......................... 254/29 R Primary Examiner—James L. Jones, Jr.

[57] ABSTRACT

A means for pulling a hammerpin including a reciprocating gripping means associated with the hammermill frame, said means initially gripping a hammerpin extension and thereafter gripping and supporting said hammerpin during the pulling thereof.

13 Claims, 8 Drawing Figures

1

HAMMERPIN PULLER

This invention relates to a device for pulling hammerpins.

Several different hammerpin pullers have been provided in the past, all have sought to cope with the facts that hammerpins tend to become swaged with use and debris tends to collect in the holes in the discs and hammers through which the hammerpins are passed. Both of these facts tend to make the pulling of hammerpins difficult, particularly at the beginning.

One simple prior art means is a drift pin and a sledge hammer, which are used to beat the hammerpin out of the rotor. This, of course, involves a great amount of manual labor. Moreover, the end of the pin sometimes is damaged and the rate at which the pin is moved cannot be readily controlled.

Mechanical means have also been provided for pulling hammerpins. Many of these devices, however, require that the hammerpin have special notches at its end. The pin is manually driven out with a drift pin and sledge hammer as above until the notches are exposed and the end of the hammerpin mechanically gripped. Frequently, mechanical hammerpin pullers of the above type are attached to the building walls around the hammermill which walls must be reinforced to take the strain. Also, sufficient space must be provided in the building to accommodate the pin as it is pulled from the machine plus the length of the hammerpin puller attached to the end. If hydraulic means are selected, a large hydraulic power supply is needed because the length of the piston stroke must be at least equal to the length of the hammerpin, which is often in excess of ten feet long.

In view of the above shortcomings of the prior art devices, among the several objects of the present invention may be noted the provision of a hammerpin puller which is associated with the hammermill frame and easily separable therefrom and which includes reciprocating gripping means for initially gripping a hammerpin extension and thereafter gripping and supporting said hammerpin during the pulling thereof. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, FIG. 1 is a perspective view of a hammerpin puller according to this invention attached to a hammermill; shown in broken lines is a portion of the hammermill housing pivoted to open position;

Corresponding reference characters indicate corresponding parts throughout the several views of the drawings.

Figure 1:
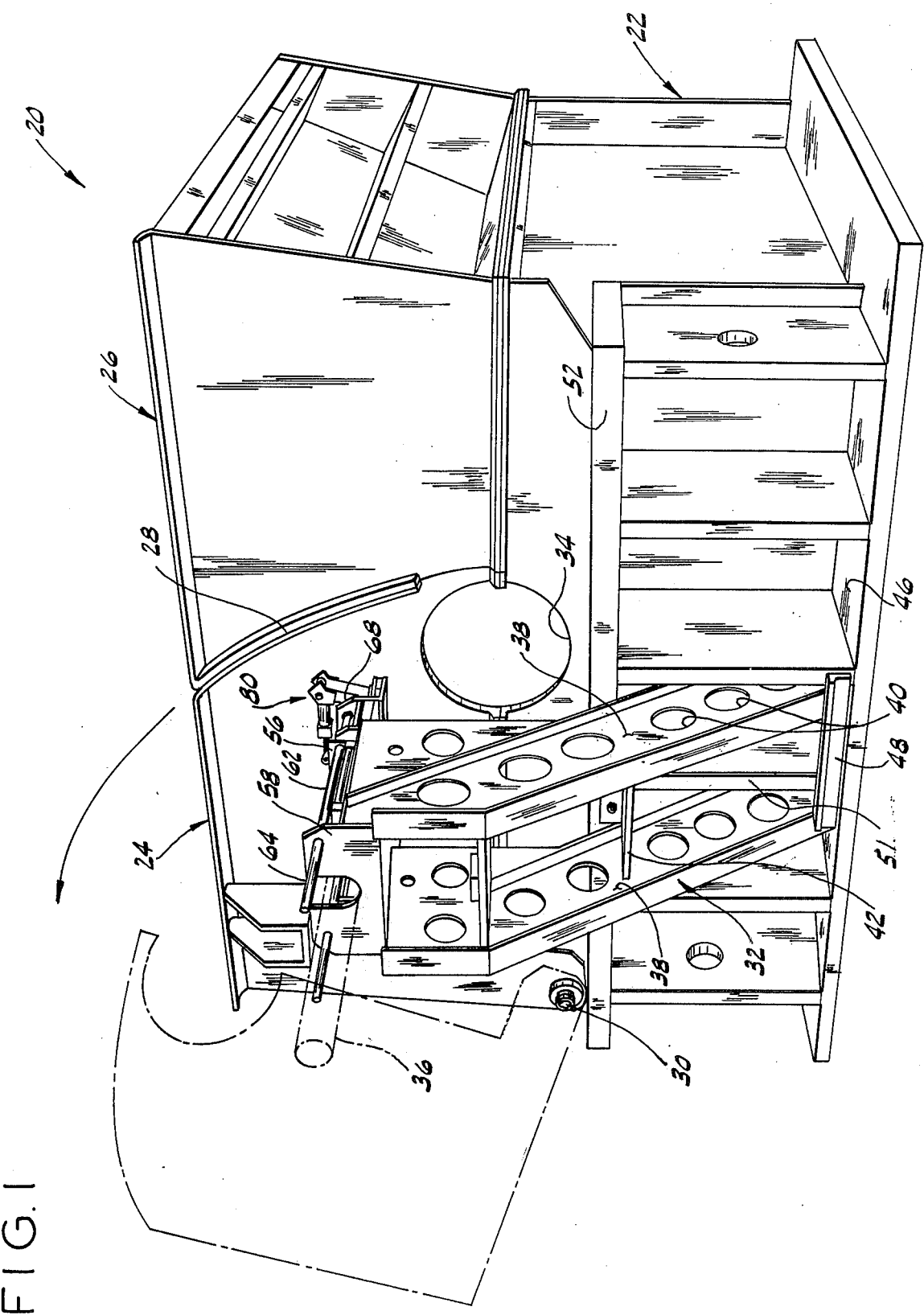

Referring now to FIG. 1, reference numeral 20 refers to a hammermill having a bottom housing 22 with a top front housing 24 and a top rear housing 26 attached to bottom housing 22 and mating along curved surface 28. Top front housing 24 is pivotable on hinge pin 30 as shown in broken lines to an open mill position thus exposing the rotor (not shown). Associated with bottom housing 22 is the hammerpin puller 32 of this invention for use as described below when top front housing 24 is pivoted to open position.

Hammermill 20 includes a rotor shaft opening 34 through which the rotor is accessed. The rotor is of a conventional construction including discs for supporting a plurality of swing hammers on several different hammerpins 36. Hammerpins 36, one of which is shown being pulled in the figures, are passed through apertures provided in the hammers and pivotably support them.

Hammerpin puller includes a pair of upright frame members 38 shown as I-shaped in cross-section and provided with holes 40 to reduce the weight thereof. Welded between upright frame members 38 is a cross member 42.

Figure 2:
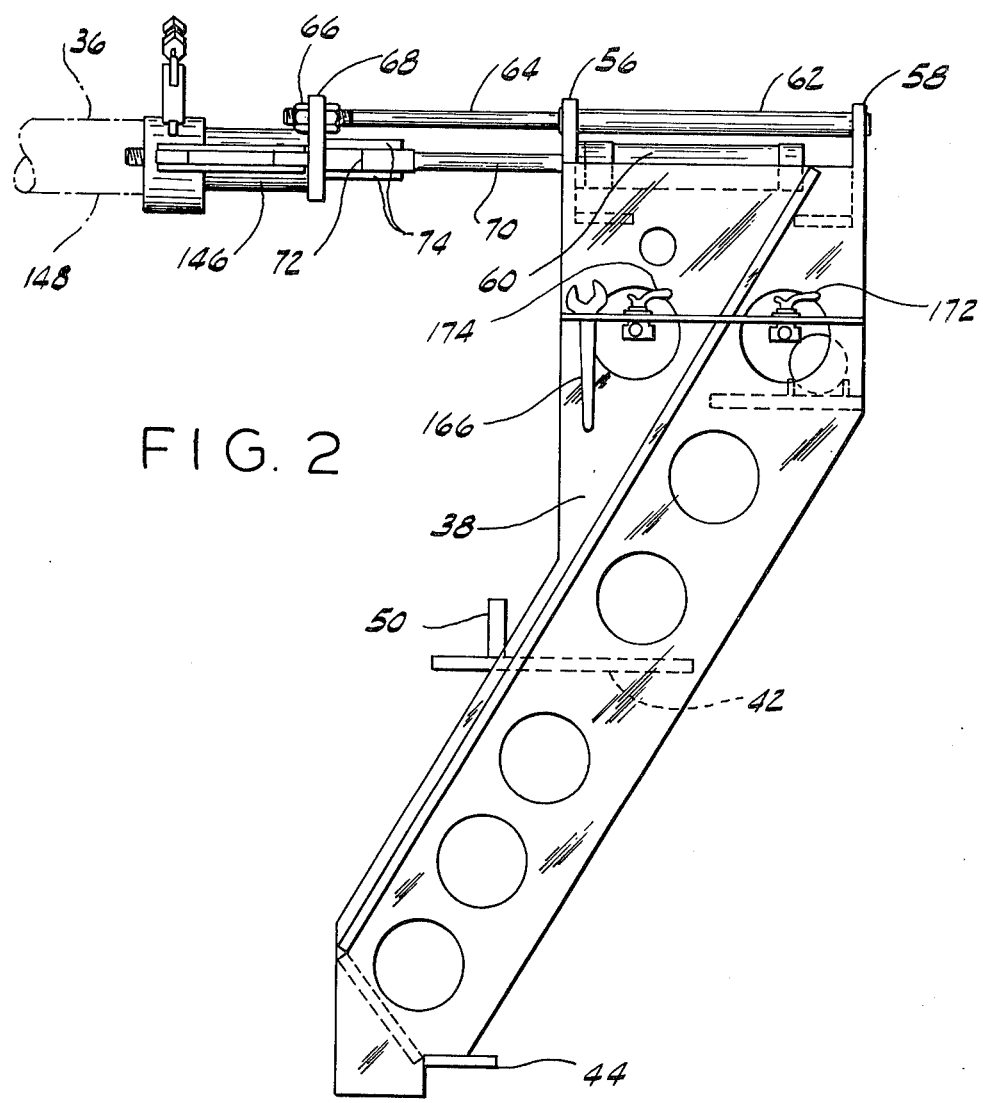
FIG. 2 is a side elevational view of the hammerpin puller shown in FIG. 1.

As best seen in FIG. 2, upright frame members 38 have flanges 44 at their lower ends through which bolts (not shown) are passed for attaching the upright frame members to a bottom flange 46 associated with bottom housing 22. A block 48 is attached to flange 46 as bracing means when hammerpin 36 is pulled to prevent upright frame members 38 from tearing loose from the flange.

Cross member 42 includes a flange 50, best shown in FIG. 2. Cross member 42 is notched (not shown) to accommodate an upright bearing pedestal support 51, one of which is straddled as best seen in FIG. 1 between upright frame members 38. Cross member 42 and flange 50 are attached to bearing pedestal 52 by bolts (not shown).

Figure 3:
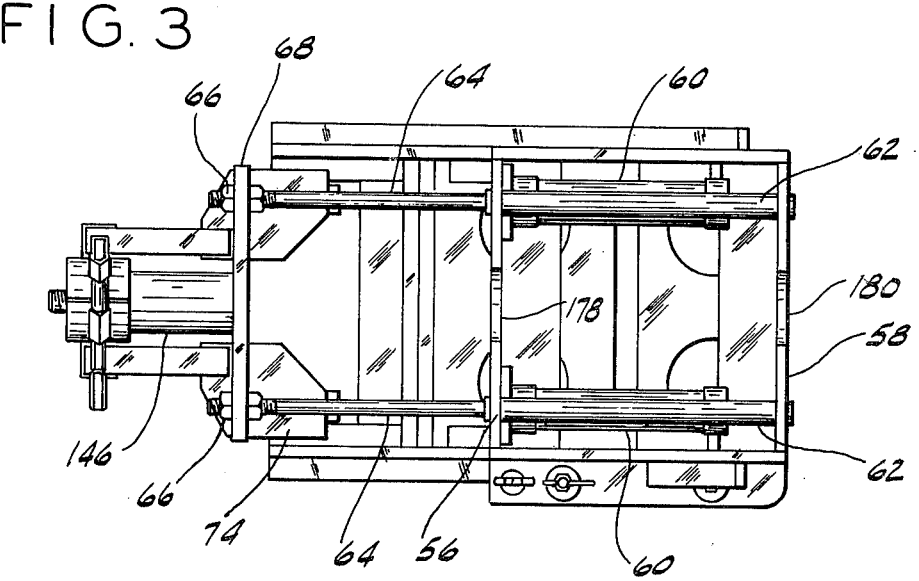
FIG. 3 is a top plan view of the hammerpin puller.
Figures 4, 8:
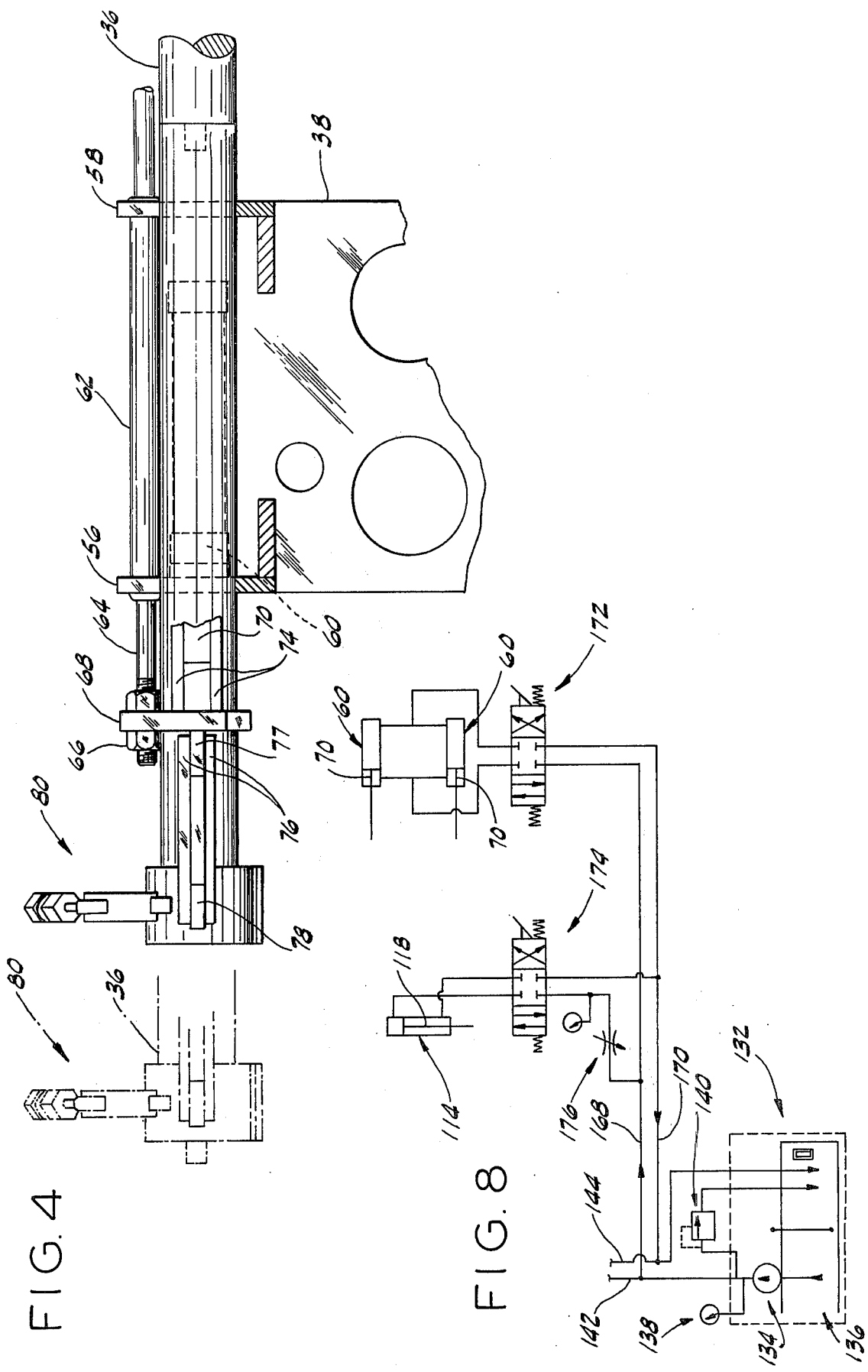
FIG. 4 is an enlarged side elevational view of the hammerpin puller with part of the support frame broken away; shown in broken lines is the hammerpin puller at the beginning of a pulling stroke.
FIG. 8 is a schematic view of several hydraulic circuits.

As best seen in FIG. 4, a front yoke 56 forms a first upstanding flange joining the front upper edges of upright frame members 38 and a rear yoke 58 forms a second upstanding flange joining the rear upper edges of upright frame members 38. Referring to FIGS. 2–4, it is seen that front yoke 56 supports along its lower margin a pair of spaced hydraulic cylinders 60 and with rear yoke 58 support along their upper margins a pair of spaced guide rod assemblies 62, said hydraulic cylinders and said guide rod assemblies being positioned in spaced apart, parallel planes.

Spaced guide rod assemblies 62 include telescoping portions or guide rods 64 which pass through front yoke 56 and rear yoke 58 and which are fastened by bolts 66 to a clamp support plate 68. Pistons 70 of hydraulic cylinders 60 pass through front yoke 56 and are pivotably fastened by a pin 72 which passes through an eye (not shown) at the forward end of each piston to attachment plates 74, spaced pairs of which are provided at opposite sides of clamp support plate 68.

As described above, clamp support plate 68 is attached along one side to hydraulic cylinders 60 and guide rods 64 and maintained substantially perpendicular thereto. A pair of spaced apart, parallel linkage plates 76 are pivotally attached adjacent opposite edges of the other side of clamp support plate 68 by attachment ears 77. Linkage plates 76 are formed substantially perpendicular to clamp support plate 68 and thusly substantially parallel to hydraulic cylinders 60 and guide rods 64. Each pair of linkage plates 76 is spaced to receive perforated ears 78 of clamp 80 between them and pairs of the linkage plates are spaced so that hammerpin 36 is freely passed between them. Aligned apertures 82 are provided adjacent end edges 84 of linkage plates 76, opposite clamp support plate 68, for register with perforations 86, best seen in FIG. 6, in ears 78. Bolts 88 are passed through apertures 82 and perforations 86 when ears 78 are held between the pairs of linkage plates thus supporting clamp 80 substantially parallel to clamp support plate 68.

Figure 6:
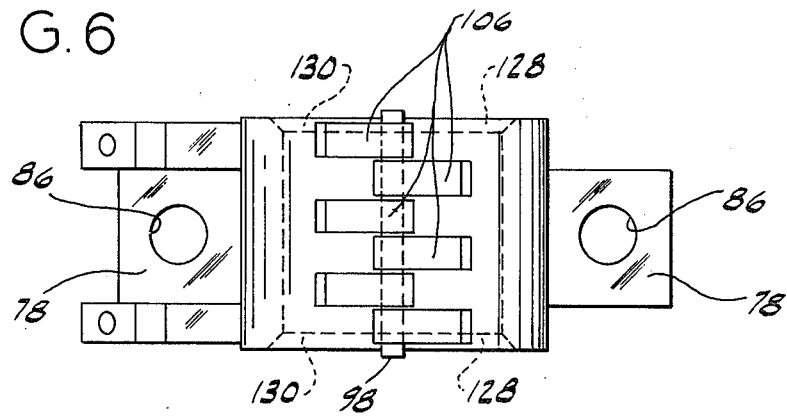
FIG. 6 is a bottom plan view of the clamp shown in FIG. 5.

Although clamp 80 is shown as hydraulic, other suitable clamps could be used. As shown, clamp 80 has a right curved arm 90 and a left, oppositely curved arm 92. Right curved arm 90 and left curved arm 92 are connected at their lower ends 94 and 96, respectively, by hinge pin 98 and at their upper ends 100 and 102, respectively, by a hydraulically operated linkage assembly 104. As seen in FIG. 6, right curved arm 90 and left curved arm 92 have knuckles 106 at their lower ends 94 and 96 through which hinge pin 98 is passed.

Figure 5:
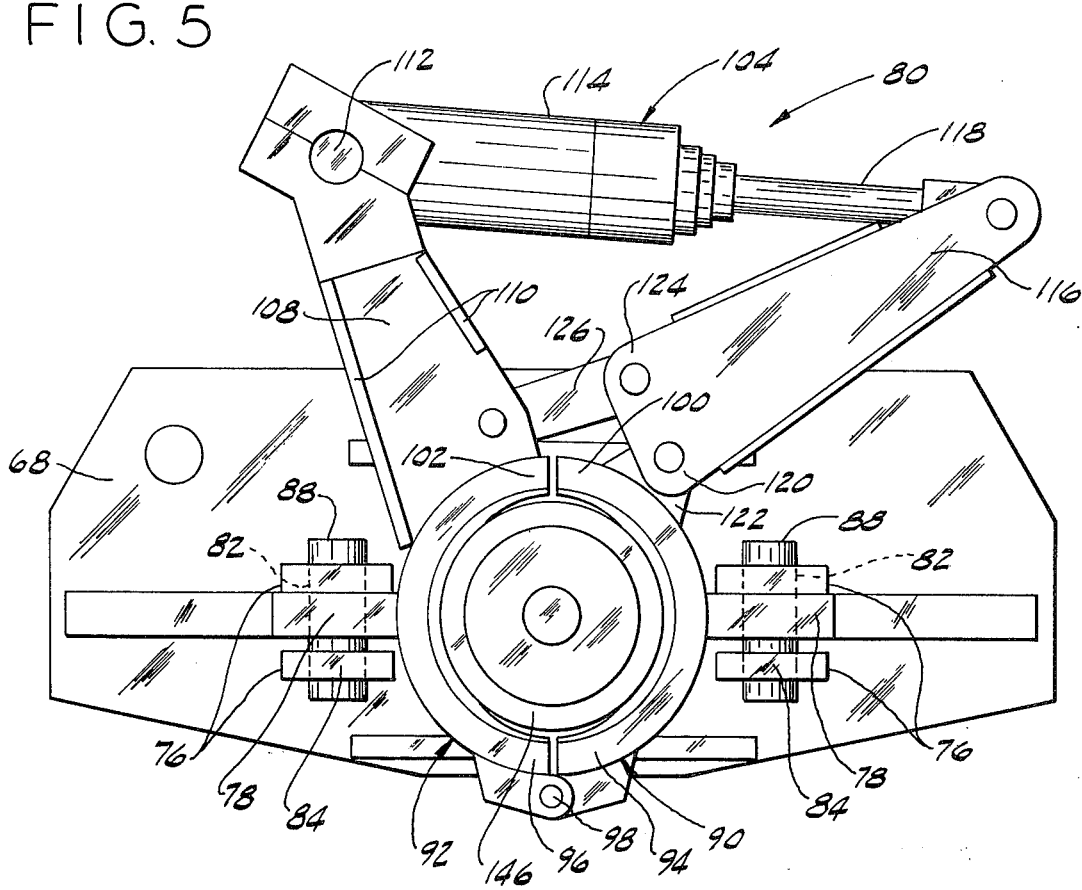
FIG. 5 is a front elevational view of a clamp for gripping hammerpins.

Hydraulically operated linkage assembly 104 includes a shorter left linkage arm 108 as viewed in FIG. 5 with reinforced side edges 110. Left linkage arm 108 is fixedly connected at one end to upper end 102 of left curved arm 92 and at its other end is pivotably connected by a pin 112 to a hydraulic cylinder 114.

Hydraulically operated linkage assembly 104 further includes a longer right linkage arm 116 which is pivotably connected at one end to a piston 118 associated with hydraulic cylinder 114 and at a right margin 120 of its other end to a tab 122 fixedly connected to upper end 100 of right curved arm 90 and at a left margin 124 to one end of a connecting arm 126. Connecting arm 126 is pivotably connected at its other end to left linkage arm 108.

More particularly, right curved arm 90 and left curved arm 92 are arcuate in cross-section and are chamfered at ends 128 and 130, respectively. As best seen in FIG. 5, right and left curved arms 90, 92 are tapered adjacent upper ends 100, 102 and lower ends 94, 96 so that hammerpin 36 may be more easily slipped into clamp 80 when it is open.

In use, top front housing 24 is pivoted open on hinge pin 30 as shown in broken lines in FIG. 1 to expose the rotor. Power supply 132 shown in FIG. 8 includes a pump 134, a reservoir 136, a pressure gauge 138 and a relief valve 140 and is connected by hydraulic lines 142 and 144 to open the housing.

The rotor is then rotated so that a selected hammerpin 36 is aligned with clamp 80. When this is done, the rotor is preferably wedged to prevent it from rotating while hammerpin puller 32 is used to pull the selected hammerpin. The locking discs at opposite ends of the rotor are then removed.

Figure 7:
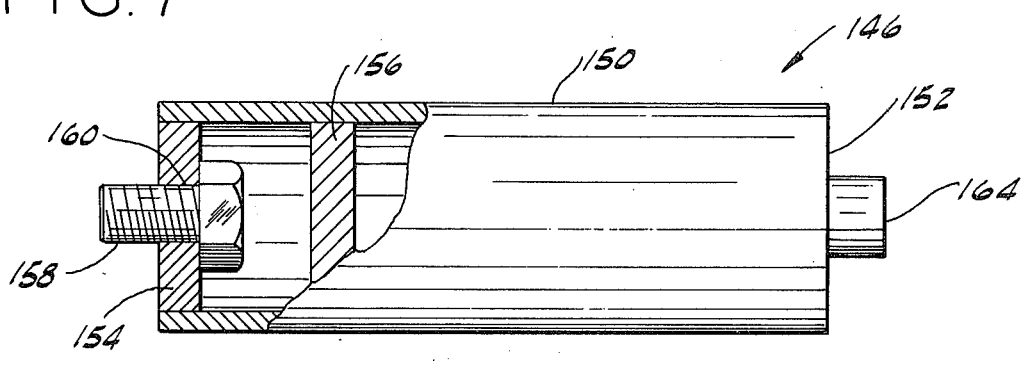
FIG. 7 is a side elevational view of a hammerpin extension, partially broken away to show structural details.

Hammerpin extension 146, shown in detail in FIG. 7, is then screwed into a tapped end 148 of the hammerpin facing the hammerpin puller 32. More particularly, hammerpin extension 146 is formed from a tube 150 having an outside diameter the same as the diameter of hammerpins 36. Tube 150 has a right end cap 152 and a left end cap 154 as viewed in FIG. 7 and an interior brace 156. Bolt 158 is passed through left end cap 154 through an aperture 160 centrally located therein. Bolt 158 is threaded to cooperatively mate with tapped end 148 provided in hammerpin 36. Right end cap 152 has stud 164 which is preferably square in cross-section to provide a wrench-grippable surface so that hammerpin extension 146 may be threaded into hammerpin 36 by means of bolt 158 when stud 164 is turned as by means of wrench 166 which is ordinarily stored in hanging position on a shelf associated with the hammerpin puller as shown in FIG. 2.

Power supply 132 is connected by hydraulic quick disconnects to lines 168 and 170 to hydraulic cylinders 60 which cause clamp 80 to reciprocate back and forth and is connected to hydraulic cylinder 114 which opens and closes the clamp.

A first hydraulic valve 172, is shown as actually seen in FIG. 2 and schematically in FIG. 8, controls cylinders 60. As seen in FIG. 8, valve 172 is spring centered so that cylinders 60 do not move unless an operator holds the valve open. When valve 172 is held to the left as viewed in FIG. 8, for example, pistons 70 are pushed out of cylinders 60 so that the forward ends move to the left. Correspondingly, when valve 172 is held to the right, pistons 70 are retracted into cylinders 60 and the forward ends of the pistons move to the right. Spring centered valve 172 is provided as a safety feature so that the operator cannot accidently cause clamp 80 to reciprocate without purposely moving valve 172.

A second hydraulic valve 174 is shown in FIG. 2 and schematically in FIG. 8. Hydraulic valve 174 has a pressure control valve 176 and is spring centered like hydraulic valve 172. When valve 174 is held to the left as viewed in FIG. 8, piston 118 moves backward so that right linkage arm 116 and connecting arm 126 pivot at their respective pivot points and clamp 80 is opened. Similarly, when valve 174 is held to the right, piston 118 is pushed out of hydraulic cylinder 114 and clamp 80 is forced to close.

With power supply 132 connected to lines 168 and 170, hydraulic valve 174 is moved to the left as viewed in FIG. 8 so that hydraulic cylinder 114 is retracted and clamp 80 opened. Hydraulic valve 172 is then moved to the left so that hydraulic cylinders 60 are fully extended and clamp 80 slips over the right end of hammerpin extension 146 as viewed in FIG. 7.

Hydraulic valve 174 is then moved to the right so that hydraulic cylinder 114 is extended and clamp 80 is closed into gripping engagement with hammerpin extension 146 as shown in FIG. 5. Hydraulic valve 172 is then moved to the right causing hydraulic cylinders 60 to retract and clamp 80 to move to the right as viewed in FIG. 2. In so doing, hammerpin extension 146 is freely passed between pairs of linkage plates 76 which are pivotally attached to clamp supportplate 68, which clamp support plate has an aperture (not shown) provided therein, and through notch 178 provided in front yoke 56. As hammerpin extension 146 is moved, hammerpin 36 is partially pulled from the rotor.

Hydraulic valves 174 and 172 are then sequentially moved to the left and the procedure described above repeated. After clamp 80 has been opened and closed and reciprocated several times while in gripping engagement with hammerpin extension 146 or hammerpin 36, hammerpin extension 146 passes through a notch 180 provided in rear yoke 58 and hammerpin 36 rests on front yoke 56 and rear yoke 58 in notches 178 and 180, respectively, provided for this purpose.

By continuing the above procedure, selected hammerpin 36 is pulled from the rotor. Other selected hammerpins 36 may be similarly pulled. To insert hammerpins, the procedure is reversed.

In view of the above, it is seen that the present invention provides a hammerpin puller which is supported from the hammermill frame and thus eliminates the need for reinforced wall supports like those required with some prior art hammerpin pullers. Furthermore, the device is easily removed from a given hammermill and attached to another selected one. It requires no more space to use the device than the length of the hammerpins and, as such, requires less space than other prior art devices which attach to the end of the hammerpin. No special nothces need be provided in the end of the hammerpin since the device initially grips the hammerpin by means of hammerpin extension 146. It eliminates most of the manual labor normally associated with hammerpin pulling and eliminates beating on the end of the pins to extract them, which beating can damage the pins, and it provides means to control the rate at which the hammerpin is pulled.

Because of the small sizes of cylinders 60, a relatively small hydraulic power supply 132 can be used to pull the hammerpins at a cost and space savings. Clamp 80 is designed to slip on hammerpin 36 before the hydraulic force of the pulling action can damage either the machine or the hammerpin puller. This is accomplished by appropriate settings of pressure control valve 176. Other safety features are designed into valves 172 and 174 which are spring centered so that the operator must manually hold the valves in operative position for movement to occur. Finally, the hammerpin puller unlike many prior art devices may be used to push the hammerpins back into the hammermill.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A means for pulling a hammerpin adapted for use with a hammermill frame and having hammerpins supporting a plurality of hammers, said pulling means including a support frame attached to the hammermill frame, a clamp for gripping a selected one of said hammerpins, a means for opening and closing the clamp on the selected hammerpin, a support plate having first and second sides, said support plate pivotally supporting the clamp on the first side and attached to a means to reciprocate the plate on the second side, first and second hammerpin engaging means for supporting the hammerpin as it is pulled, said reciprocating means attached to the first of said hammerpin engaging means, and a pair of guide rod means interconnecting the first and second hammerpin engaging means and the support plate, said first and second hammerpin engaging means supported by said support frame.

2. The means for pulling a hammerpin according to claim 1 wherein the reciprocating means includes a hydraulic cylinder.

3. The means for pulling a hammerpin according to claim 1 wherein the reciprocating means are a pair of hydraulic cylinders spaced so that the hammerpin passes freely between them and in substantial parallel alignment therewith.

4. The means for pulling a hammerpin according to claim 3 wherein the clamp is hydraulically opened and closed.

5. The means for pulling a hammerpin according to claim 4 wherein the first and second hammerpin engaging means are first and second yoke members, said first and second yoke members adapted to receive the hammerpin in notched portions thereof.

6. The means for pulling a hammerpin according to claim 5 wherein the pair of hydraulic cylinders are connected to the first yoke member.

7. The means for pulling a hammerpin according to claim 6 wherein the support plate is attached on its second side to the pistons associated with the pair of hydraulic cylinders, said pistons passing through the first yoke member.

8. The means for pulling a hammerpin according to claim 7 wherein the guide rod means are a pair of guide rod assemblies with telescoping portions, said guide rod assemblies connected to the first and second yoke members and said telescoping portions passing through the first yoke and being connected to the second side of the support plate.

9. The means for pulling a hammerpin according to claim 8 wherein the clamp has perforated support ears and is supported by linkage plates pivotally connected to the first side of the support plate, said linkage plates having apertures adapted to register with the apertures in the perforated ears and to receive a pin.

10. The means for pulling a hammerpin according to claim 9 which further includes in combination, a hammerpin extension, said extension having a threaded portion adapted to be received in a tapped end of a hammerpin.

11. The means for pulling a hammerpin according to claim 10 wherein the hammerpin extension has the same outside diameter as the hammerpin.

12. The means for pulling a hammerpin according to claim 11 wherein the hammerpin extension is right circular cylindrical in shape and has a stud at one end adapted to be wrench grippable so that the threaded portion is screwable into the tapped end of the hammerpin.

13. The means for pulling a hammerpin according to claim 12 wherein the first and second yoke members, the support plate and the clamp are substantially parallel and wherein the hydraulic cylinders and their associated pistons and the guide rod assemblies and their associated telescoping portions are substantially parallel and substantially perpendicular to the first and second yoke members, the support plate and the clamp.

* * * * *